US012539835B2

United States Patent
Van Thiel

(10) Patent No.: US 12,539,835 B2
(45) Date of Patent: Feb. 3, 2026

(54) METHOD FOR OPERATING AN ELECTROPNEUMATIC PARKING BRAKE MODULE, ELECTROPNEUMATIC PARKING BRAKE MODULE, ELECTRONICALLY CONTROLLABLE PNEUMATIC BRAKE SYSTEM, VEHICLE

(71) Applicant: ZF CV Systems Global GmbH, Bern (CH)

(72) Inventor: Julian Van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 729 days.

(21) Appl. No.: 17/825,159

(22) Filed: May 26, 2022

(65) Prior Publication Data

US 2022/0289159 A1   Sep. 15, 2022

Related U.S. Application Data

(63) Continuation of application No. PCT/EP2020/082388, filed on Nov. 17, 2020.

(30) Foreign Application Priority Data

Nov. 26, 2019  (DE) ...................... 10 2019 131 930.7
Nov. 17, 2020  (DE) ...................... 10 2020 130 261.4

(51) Int. Cl.
*B60T 13/38*    (2006.01)
*B60T 8/36*     (2006.01)
(Continued)

(52) U.S. Cl.
CPC .............. *B60T 8/94* (2013.01); *B60T 8/3605* (2013.01); *B60T 13/385* (2013.01);
(Continued)

(58) Field of Classification Search
CPC ........ B60T 8/94; B60T 8/3605; B60T 13/385; B60T 13/683; B60T 15/027; B60T 2270/402; B60T 2270/414
See application file for complete search history.

(56) References Cited

U.S. PATENT DOCUMENTS 10,946,848 B2 *   3/2021   Van Thiel ............. B60T 13/683
11,572,047 B2 *   2/2023   Van Thiel ............. F16K 31/423
(Continued)

FOREIGN PATENT DOCUMENTS

CN       101312864 A      11/2008
CN       201484402 U       5/2010
(Continued)

OTHER PUBLICATIONS

International Search Report of the European Patent Office dated Feb. 17, 2021 for international application PCT/EP2020/082388 on which this application is based.

(Continued)

*Primary Examiner* — Thomas W Irvin
(74) *Attorney, Agent, or Firm* — Walter Ottesen, P.A.

(57) ABSTRACT

The disclosure relates to a method for operating an electropneumatic parking brake module for an electronically controllable pneumatic brake system for a vehicle, in particular a commercial vehicle, having a supply port for receiving a supply pressure, at least one parking brake port for the connection of at least one parking brake cylinder, a main valve assembly which receives the supply pressure and is configured to output a spring brake pressure at the parking brake port in dependence on a control pressure, and a pilot valve assembly which receives the supply pressure and is to provide the control pressure, wherein the pilot valve assembly has a bistable valve which can be switched between a first air admission position and a second air release position, (Continued)

and a control unit for providing first and second switch signals to the pilot valve assembly.

25 Claims, 6 Drawing Sheets

(51) Int. Cl.
  *B60T 8/94* (2006.01)
  *B60T 13/68* (2006.01)
  *B60T 15/02* (2006.01)

(52) U.S. Cl.
  CPC .......... *B60T 13/683* (2013.01); *B60T 15/027* (2013.01); *B60T 2270/402* (2013.01); *B60T 2270/414* (2013.01)

(56) References Cited

U.S. PATENT DOCUMENTS

| | | | |
|---|---|---|---|
| 11,590,951 B2 * | 2/2023 | Van Thiel | B60T 13/683 |
| 12,109,985 B2 * | 10/2024 | Klostermann | B60T 13/683 |
| 12,263,821 B2 * | 4/2025 | van Thiel | B60T 13/683 |
| 2004/0187674 A1 | 9/2004 | Bennett et al. | |
| 2010/0025141 A1 | 2/2010 | Bensch et al. | |
| 2010/0237690 A1 | 9/2010 | Foerster et al. | |
| 2020/0079341 A1 | 3/2020 | Van Thiel | |
| 2020/0139952 A1 * | 5/2020 | Van Thiel | B60T 13/385 |
| 2020/0189550 A1 | 6/2020 | van Thiel | |
| 2020/0207319 A1 | 7/2020 | Van Thiel | |
| 2020/0307537 A1 * | 10/2020 | Van Thiel | B60T 13/263 |
| 2022/0227342 A1 * | 7/2022 | Klostermann | B60T 8/171 |
| 2022/0266807 A1 * | 8/2022 | van Thiel | B60T 17/221 |
| 2023/0010827 A1 * | 1/2023 | van Thiel | B60T 13/385 |
| 2023/0012205 A1 * | 1/2023 | van Thiel | B60T 15/041 |
| 2024/0109524 A1 * | 4/2024 | Klostermann | B60T 13/261 |
| 2024/0198991 A1 * | 6/2024 | van Thiel | B60T 13/683 |
| 2024/0246520 A1 * | 7/2024 | van Thiel | B60T 13/22 |
| 2024/0375627 A1 * | 11/2024 | van Thiel | B60T 7/20 |

FOREIGN PATENT DOCUMENTS

| | | |
|---|---|---|
| CN | 101801747 A | 8/2010 |
| CN | 109803860 A | 5/2019 |
| CN | 110446634 A | 11/2019 |
| DE | 10 2007 016 335 A1 | 10/2008 |
| DE | 10 2015 008 377 A1 | 12/2016 |
| DE | 10 2017 001 409 A1 | 8/2018 |
| DE | 10 2019 131 930 A1 | 5/2021 |
| EP | 3 112 230 A1 | 1/2017 |
| WO | 2019/034296 A1 | 2/2019 |
| WO | 2019/042602 A1 | 3/2019 |

OTHER PUBLICATIONS

Translation of the written opinion of the international searching authority dated Feb. 17, 2021 for international application PCT/EP2020/082388 on which this application is based.

English translation and Second Office Action of the Chinese Patent Office dated Nov. 9, 2024 in corresponding Chinese patent application No. 202080081725.1.

English translation of First Office Action of the Chinese Patent Office dated May 1, 2024 in corresponding Chinese patent application No. 202080081725.1.

* cited by examiner

METHOD FOR OPERATING AN ELECTROPNEUMATIC PARKING BRAKE MODULE, ELECTROPNEUMATIC PARKING BRAKE MODULE, ELECTRONICALLY CONTROLLABLE PNEUMATIC BRAKE SYSTEM, VEHICLE

CROSS REFERENCE TO RELATED APPLICATIONS

This application is a continuation application of international patent application PCT/EP2020/082388, filed Nov. 17, 2020 designating the United States and claiming priority from German applications 10 2019 131 930.7, filed Nov. 26, 2019, and 10 2020 130 261.4, filed Nov. 17, 2020, and the entire content of the above applications is incorporated herein by reference.

TECHNICAL FIELD

In modern electronically controllable pneumatic brake systems, which are used in particular in commercial vehicles which are provided for autonomous driving operation, it is important to provide measures which, in the event of a fault in the brake system, nevertheless permit reliable deceleration of the commercial vehicle.

BACKGROUND

DE 10 2017 001 409 A1 describes a method for controlling an autonomous vehicle having a vehicle controller for controlling autonomous driving functions of the vehicle and having a brake controller for controlling braking functions of a brake system, in particular a pneumatic brake system, of the vehicle having at least one brake device, in particular a parking brake. Via the brake controller and/or the vehicle controller, the brake device can be activated for braking and deactivated for driving by actuation of at least one switch element. The solution disclosed in DE 10 2017 001 409 A1 is distinguished in that the switch element, preferably a solenoid valve, has two electrical conductors for actuation, wherein one of the two conductors is switched by the brake controller and the other of the two conductors is switched by the vehicle controller.

The electrical connection of the brake valve to both the brake controller and the vehicle controller disclosed in DE 10 2017 001 409 A1 permits a fail-safe. In the event of failure or malfunctioning of only one of the two controllers, the brake device is activated via the brake valve, since the solenoid is then switched off. Each of the controllers thereby switches only one of the two conductors of the supply line of the solenoid.

DE 10 2015 008 377 A1 discloses a parking brake module of a parking brake device, having an electronic control device, at least one solenoid valve which can be actuated by the control device, and a pressure medium boosting valve for application of pressure medium to at least one brake actuator. Furthermore, the parking brake module has an emergency release pressure medium port and a double check valve, with which an emergency release function of the parking brake device can be provided, for which purpose the emergency release pressure medium port is connected via a first pressure medium line via a check valve to the supply input of the pressure medium boosting valve and via a second pressure medium line to an input of the double check valve.

Despite the generally advantageous fail-safe, which in the present case is implemented electrically, the concepts which have been presented are still in need of improvement. This concerns in particular a simple construction of the system, that is, keeping the outlay in terms of apparatus for an electronically controllable pneumatic brake system as low as possible in order to save installation space and weight and to minimize the complexity of the brake system.

It would therefore be desirable to provide a method for operating an electronically controllable pneumatic brake system in which the disadvantages of the prior art are at least partly eliminated.

SUMMARY

It is an object of the disclosure to provide a method for operating an electronically controllable pneumatic brake system in which the disadvantages of the prior art are at least partly eliminated.

The object, as far as the electropneumatic parking brake module is concerned, can, for example, be achieved via a method for operating an electronically controllable pneumatic brake according to the disclosure. The disclosure proceeds from a method for operating an electropneumatic parking brake module for an electronically controllable pneumatic brake system for a vehicle, in particular a commercial vehicle, having a supply port for receiving a supply pressure, at least one parking brake port for the connection of at least one parking brake cylinder, a main valve unit which receives the supply pressure and is configured to output a spring brake pressure at the parking brake port in dependence on a control pressure, and a pilot valve assembly which receives the supply pressure and is to provide the control pressure, wherein the pilot valve assembly has a bistable valve which can be switched between a first air admission position and a second air release position, and a control unit for providing first and second switch signals to the pilot valve assembly, wherein the pilot valve assembly has a monostable holding valve which is pneumatically connected in series with the bistable valve and is arranged in a control line of the main valve unit, wherein the holding valve is normally open in an open position, and the control unit is configured to hold the holding valve in the holding position via the first switch signal in order to hold the control pressure, and an additional input port for receiving an additional control pressure provided at an additional brake pressure port is arranged in the control line, including the step: filling the parking brake cylinder by pressurizing the control port of the main valve assembly in order to output the spring brake pressure at the parking brake port in dependence on the control pressure, wherein the pressurization of the control port is effected via an additional control pressure which is provided at the additional brake pressure port and is received via the additional input port.

According to the disclosure, it is provided in the method that the holding valve automatically switches into an open position for releasing air from the control port in the event of a fault in an electronic component, in particular in a control unit of the brake system, and/or in the event of a power failure, wherein air is released from the control port of the main valve assembly for the release of air from the parking brake port.

The disclosure proceeds from the consideration that it is advantageous to expand a brake system with a low outlay such that reliable operation is possible even in an autonomous operating mode. Reliable operation thereby includes a fail-safe via which the vehicle, in the event of a fault in the brake or a serious fault in the system as a whole or a power failure, can nevertheless be decelerated and brought into a safe state.

The disclosure includes the finding that it is advantageous to keep the outlay in terms of apparatus of such a fail-safe as low as possible in order to save weight and installation space and to increase the complexity of the brake system only as little as is necessary. In particular, a fail-safe is to be achieved while largely retaining the current architecture of the service brake and of the on-board power supply of the vehicle.

Because the pilot valve assembly has a holding valve, the control pressure at the control port of the main valve unit can be held when the holding valve is held in the holding position by the control unit via the first switch signal in order to hold the control pressure.

Because an additional input port for receiving an additional control pressure provided at an additional brake pressure port is arranged in the control line, the control port—independently of a manual operating mode in which the main valve unit is pressurized via the supply port and the pilot valve assembly—can be operated in a further, in particular automatic operating mode. In such a further, in particular automatic operating mode, air is admitted to the control connection via an additional brake pressure port, and air is released in particular via the holding valve of the pilot valve assembly. In both operating modes, manual and automatic, the brake pressure can be provided via a supply port; however, the actuation of the main valve unit changes via the control port. Within the context of the application, an input port refers to a pneumatic port or the like pneumatic connectivity.

Via the holding valve it is possible to hold the control port of the main valve unit under pressure even when the bistable valve is in an air release position. A fail-safe is thus achieved via the holding valve, since it is not actuated in the event of a fault or power failure and thus switches automatically, in particular as a result of the spring force of a holding valve return spring, into its open position for releasing air from the control port and thus for braking operation of the parking brake cylinders.

Thus, with the method according to the disclosure, independent actuation for releasing one or more parking brake cylinders can be achieved in that the additional brake pressure port for providing the additional control pressure is pneumatically connected to a pressure source, for example an axle modulator, in particular a front or rear axle modulator, and at the same time a fail-safe can be provided via the normally open holding valve.

Because it is possible to hold the control pressure at the control port of the main valve unit independently of the bistable valve, a method according to the disclosure also makes a fail-safe possible in the time period in which the parking brake is released. In a parking brake module according to the prior art, in which release of the parking brake takes place via switching of the bistable valve, this fail-safe would not be provided since, in the event of a fault or power failure in the time period in which the bistable valve—for releasing the parking brake—is in an air admission position, the release of air for the purpose of emergency braking would not be possible—and an air release position would also not be achievable automatically owing to the bistable nature of the bistable valve, which remains in its switch position when it is not energized. Via the electropneumatic parking brake module according to the disclosure having a holding valve, a fail-safe, that is, the possibility of failure braking in the event of a fault and/or power failure, is ensured even during release since actuation of the main valve unit can take place independently of the bistable valve.

Via automatic air release, a fail-safe is advantageously achieved if there is a fault and/or power failure in the brake system, in particular in a central control unit or control unit of the brake system and/or of the electropneumatic parking brake module. Because the holding valve is configured in particular to be normally open, air is released from the control port of the main valve unit in the event of failure of the actuation of the holding valve in the event of such a fault and/or power failure, whereby air is also released from the parking brake port and thus the parking brake cylinders, whereby the vehicle is brought to a standstill.

Within the context of the disclosure, a service brake system means a brake system which is generally operable via a brake signal transmitter and which can be used for braking during operation of the vehicle in that service brake cylinders are actuated via one or more axle modulators by being pressurized with compressed air. By contrast, a parking brake generally serves to hold the vehicle in the rest state via one or more parking brake cylinders, which in particular are in the form of spring brake cylinders and can be released by pressurization with compressed air in order to move the vehicle. In an automatic operating mode, in which in particular relatively low speeds of less than 10 km/h are to be expected, the parking brake in an electropneumatic parking brake module according to the disclosure is used for a fail-safe, that is, to ensure failure braking in the event of a fault and/or power failure.

The control unit can be a control module integrated in the electropneumatic parking brake module, or a hardware or software module which is integrated in a central module of the vehicle controller or of the brake controller and is associated with the electropneumatic parking brake module.

In a further embodiment of a method, it is provided that, for pressurizing the control port with the additional control pressure, the holding valve is switched into the open position and/or is held in the open position. Such a further embodiment of the method is advantageous in particular when the additional input port is arranged in the control line between the bistable valve and the holding valve or is formed as a bistable valve port of the bistable valve, because in such cases the additional control pressure can be guided from the additional brake pressure port to the control port of the main valve assembly.

In a further embodiment of a method, it is provided that, for holding the additional control pressure at the control port, the holding valve is held in the holding position. The holding valve is held in the holding position in particular following pressurization of the control port with an additional control pressure. In particular, when the additional control pressure is still provided by the additional brake pressure port, the holding valve is switched into the holding position, and in particular only then is the provision of the additional control pressure at the additional brake pressure port ended. In this manner, the additional control pressure is held, or trapped, by the holding valve at the control port of the main valve assembly. In such a further embodiment of the method, the parking brake can advantageously be held in the released state, namely independently of the bistable valve.

In a further embodiment of a method, it is provided that, for pressurizing the control port with the additional control pressure, the bistable valve is switched into the air release position and/or remains in the air release position. Such a further embodiment of the method is advantageous in particular when the additional input port is formed as a bistable valve port, in particular as the third bistable valve port, of the bistable valve, because in such cases the additional control pressure can be guided from the additional brake pressure port to the control port of the main valve assembly. In particular, the bistable valve remains permanently in its air release position. The bistable valve remaining permanently in its air release position advantageously allows the parking brake to be operated independently of the bistable valve, in particular allows the holding valve to release air from the control port of the main valve assembly independently of the bistable valve, in order to allow the parking brake to engage in order to trigger failure braking.

In a further embodiment of the method, it is provided that the holding valve is switched into its holding position before the control port is pressurized with the additional control pressure. Such a further development is advantageous in particular when the additional input port is arranged in the control line between the holding valve and the control port of the main valve assembly.

In a further embodiment of the method, it is provided that the additional input port is formed as a first selection valve port of a selection valve unit for receiving the additional control pressure. In a further embodiment of the method, it is provided that the selection valve unit is arranged between the holding valve and a control port of the main valve unit. In a further embodiment of the method, it is provided that the selection valve unit is arranged between the bistable valve and the holding valve. In a further embodiment of the method, it is provided that the additional input port is formed by a bistable valve port of the bistable valve, in particular a third bistable valve port, which is pneumatically connected to the holding valve in the air release position and in particular is closed in the air admission position.

In a further embodiment of the method, it is provided that the release of air from the control port further takes place via the bistable valve, wherein the bistable valve is permanently in the air release position in automatic operation. Because the bistable valve is permanently in the air release position in automatic operation, the availability of the fail-safe is advantageously ensured at all times during automatic operation, because the release of air from the control port of the main valve unit, which would result in braking, is dependent only on the holding valve.

In a further embodiment of the method, it is provided that the additional control pressure is provided by an additional brake component and/or by an axle modulator, in particular by a front axle modulator, by a rear axle modulator or by a trailer control valve. In such a further embodiment of the method, the additional control pressure can advantageously be provided by a compressed air source of the brake system that is already present, in particular by an axle modulator of the service brake system.

In a further embodiment of the method, it is provided that the additional control pressure is formed by a front axle brake pressure or a rear axle brake pressure or a trailer brake pressure or is derived from one of those brake pressures. In such a further embodiment, the respective brake pressure, which is provided in particular by an axle modulator of the service brake system, can be used to actuate the main valve unit in order to release the parking brake cylinders of the brake system.

In a further embodiment of the method, it is provided that the pressurization of the control port via the additional control pressure is ended when a desired spring brake pressure for the spring brake pressure provided at the parking brake port is reached. In such a further embodiment of the method, the spring brake pressure outputted by the main valve unit is measured, in particular using a pressure sensor. Knowledge of the outputted spring brake pressure allows the main valve unit to be closed when the desired spring brake pressure is reached. In this manner, a suitable spring brake pressure can always be provided at the parking brake port in the sense of a control circuit.

In a further embodiment of the method, it is provided that the pressurization of the control port via the additional control pressure takes place during a pressurization time period, wherein the pressurization time period has a duration of between 0.5 and 1 second. Such a time period generally gives sufficient time for an adequate control pressure to build up at the control port of the main valve unit.

In a further embodiment of the method, it is provided that the control port is pressurized via the additional control pressure again when the spring brake pressure has fallen to a value below the desired spring brake pressure. The spring brake pressure can fall to a value below the desired spring brake pressure, for example, if the pressure present at the control port of the main valve unit falls to a value below a desired value for the additional control pressure. A pressure drop at the control port can occur, for example, due to leaks in the control line between the holding valve and the control port of the main valve unit, in particular at the selection valve. As a consequence of a pressure drop at the control port, the outputted spring brake pressure correspondingly falls to a value below the desired spring brake pressure. The presence of such leaks can thus be compensated for by pressurizing the control port again. In particular, a drop in the outputted spring brake pressure can be detected by a pressure sensor pneumatically connected to the third main valve port. The desired spring brake pressure is preferably between 4 and 8 bar, very preferably 6 bar.

In a further embodiment of the method, it is provided that, for pressurizing the control port with the additional control pressure, the holding valve is switched into the open position, and the holding valve is switched into the holding position again in particular after the pressurization or shortly before the end of the pressurization.

In particular, it is provided in the method that, for holding the additional control pressure at the control port, the holding valve is held in the holding position in particular following pressurization with the additional control pressure.

In a second aspect, the disclosure, for achieving the object, further provides an electropneumatic parking brake module for an electronically controllable pneumatic brake system for a vehicle, in particular a commercial vehicle, having a supply port for receiving a supply pressure, at least one parking brake port for the connection of at least one parking brake cylinder, a main valve unit which receives the supply pressure and is configured to output a spring brake pressure at the parking brake port in dependence on a control pressure, and a pilot valve assembly which receives the supply pressure and is to provide the control pressure, wherein the pilot valve assembly has a bistable valve which can be switched between a first air admission position and a second air release position, and a control unit for providing first and second switch signals to the pilot valve assembly, wherein the pilot valve assembly has a monostable holding valve which is pneumatically connected in series with the bistable valve and is arranged in a control line of the main valve unit, wherein the holding valve is normally open in an open position, and the control unit is configured to hold the holding valve in the holding position via the first switch signal in order to hold the control pressure, and an additional input port for receiving an additional control pressure provided at an additional brake pressure port is arranged in the control line.

In the electropneumatic parking brake module according to the second aspect it is provided that the holding valve automatically switches into an open position for releasing air from the control port in the event of a fault in an electronic component, in particular in a control unit of the brake system, and/or in the event of a power failure, wherein air is released from the control port of the main valve assembly for the release of air from the parking brake port. In the electropneumatic parking brake module according to the second aspect of the disclosure, the advantages of the method according to the first aspect of the disclosure are used correspondingly.

The electropneumatic parking brake module can be further developed in that the additional input port is formed as a first selection valve port of a selection valve unit for receiving the additional control pressure, wherein the selection valve unit has a check characteristic at the first selection valve port such that the first selection valve port opens in a direction of flow from the additional brake pressure port via a third selection valve port to the control port and closes contrary to the direction of flow. Via the check characteristic of the selection valve it is advantageously achieved that the additional control pressure is still held at the control port even after the pressure at the additional brake pressure port has fallen. As a result, the main valve unit is actuated such that a spring brake pressure for releasing the parking brake cylinders is provided at the parking brake port. A selection valve advantageously makes it possible in particular that, of a first and a second selection valve port, the port at which the higher pressure is present opens, and connects that opened selection valve port to a third selection valve port.

Within the context of the disclosure, an additional input port, in particular a selection valve unit, can be formed in the simplest case by an additional pneumatic port for the additional brake pressure port at the control line, which in particular has a check characteristic.

Advantageously, it is provided that the selection valve unit is arranged between the holding valve and a control port of the main valve unit. In such a further embodiment, an additional control pressure can advantageously be inputted without the holding valve having to be opened.

In particular, it is provided that the selection valve unit is arranged between the bistable valve and the holding valve. In such a further embodiment, holding of the pressure guided as additional control pressure to the control port of the main valve unit by the holding valve is possible, in particular without a check characteristic of the additional input port being required.

The electropneumatic parking brake module can be further developed in that the additional input port is formed by a bistable valve port of the bistable valve, in particular a third bistable valve port, which is pneumatically connected to the holding valve in the air release position and in particular is closed in the air admission position. In such a further embodiment, the bistable valve that is present can advantageously be used to guide the additional control pressure into the control line, and an additional valve can be dispensed with.

Advantageously, a trailer valve is provided, which is preferably in the form of a 3/2-way valve, particularly preferably in the form of a 3/2-way solenoid valve. The trailer valve is in particular configured to pneumatically connect the supply port to a trailer port in a first, supply position and to pneumatically connect the third main valve port to the trailer port in a second, control position. Via a trailer valve, a trailer connected to the vehicle can advantageously be supplied with compressed air, in particular either with a supply pressure or with a spring brake pressure. Via a trailer valve, a parking brake of the trailer can in particular be supplied with a spring brake pressure.

The electropneumatic parking brake module can be further developed in that the holding valve is arranged between the bistable valve and the control port of the main valve unit. Such an arrangement of the holding valve has been found to be advantageous, in particular because, owing to its proximity to the control port, the volume of the control pressure to be held can advantageously be kept small.

Advantageously, it is provided that the holding valve is in the form of a 2/2-way solenoid valve. In such a further embodiment, the holding valve automatically places itself in its open position when the magnet armature of the solenoid valve is not energized.

Advantageously, it is provided that the bistable valve is in the form of a 3/2-way bistable solenoid valve.

The electropneumatic parking brake module can be further developed in that the main valve unit has a throttle, configured to produce a pneumatic connection between a third main valve port, connected to the parking brake port, and the control port of the main valve unit.

The pneumatic connection produced by the throttle and optionally by a main valve bypass line is such that, if the control pressure at the control port falls as a result of leakage, the control pressure is adjusted to a value of the spring brake pressure outputted at the third main valve port. Owing to the smaller line cross-section of the throttle, such an adjustment takes place slowly compared to a flow of compressed air—caused by switching of the holding valve or bistable valve. Via such a throttle, leaks, in particular in the control line, which lead to a drop in the control pressure at the control port, can be compensated.

In particular, it is provided that the selection valve unit has a shuttle valve which is configured to connect the first or a second selection valve port to the third selection valve port, wherein, of the first and second selection valve ports, the port at which the higher pressure is present is opened. In such a further embodiment, the check characteristic is implemented via a valve body which is movable inside the shuttle valve and can be pressed in a sealing manner against both the first selection valve port and the second selection valve port. In this manner, of the first or second selection valve port, the port at which the higher pressure is present is always pneumatically connected to the third selection valve port, and the respective other of the two is closed. With such a shuttle valve it is advantageously achieved that a pressure present at the first selection valve port and additionally a pressure present at the second selection valve port are not added together, since the port at which the lower pressure is present is always closed by the valve body. Thus, the risk of an excessively high and possibly damaging pressure at the control port can be reduced.

The electropneumatic parking brake module can be further developed in that the shuttle valve has a biasing spring for the spring-loaded setting of a valve position, in particular for the spring-loaded setting of the first valve position. In the first valve position, the first selection valve port leading to the additional brake pressure port is closed and in particular the pilot valve assembly is connected to the control port (or the bistable valve is connected to the holding valve). Via such a biasing spring, the valve body of the shuttle valve, by the selection of a suitable spring constant, can be pressed in a sealing manner with a defined return force against a selection valve port, in particular the first selection valve port. Thus, the compressed air provided at the additional brake pressure port must first overcome this return force before the first selection valve port opens. In this manner, it can advantageously be prevented that the first selection valve port opens when the compressed air pressure applied to the additional brake pressure port is only low. Via the biasing spring, the valve body is stably held in its valve position set as its rest position by the biasing spring.

The electropneumatic parking brake module can be further developed in that the additional input port and/or the selection valve unit has at the first selection valve port a check valve which closes contrary to the direction of flow. In such a further embodiment, a flow of air contrary to the direction of flow can be prevented by a valve body seated in a sealing manner. It is thereby advantageously achieved that an amount of compressed air provided with an additional control pressure at the additional brake pressure port can flow to the control port of the main valve unit but, if the pressure at the additional brake pressure port falls, the compressed air cannot escape via that port. In this manner, a check characteristic of the selection valve is achieved and the control pressure at the control port can be held when the holding valve is closed. In particular, the check valve can have a check valve biasing spring.

The electropneumatic parking brake module can be further developed in that the selection valve unit has a bypass line, wherein the bypass line pneumatically connects the second and third selection valve ports and has a throttle and/or a bypass check valve. Via a bypass line, a return force can be generated by a pressure equalization between the second and third selection valve ports, which return force presses a valve body for producing the check characteristic in a sealing manner against the first selection valve port. The production of a deliberate leakage by the bypass line means that, when air is admitted to the first selection valve port—in which case the valve body is pressed against the second selection valve port—the additional control pressure present at the first selection valve port can also be established at the second selection valve port, namely via the bypass line, despite that position of the valve body. As a result, after the pressure at the first selection valve port has fallen, a return force which presses the valve body in a sealing manner against the first selection valve port is generated by a pressure gradient between the first and second selection valve ports. In a bypass line with a throttle, the generation of the return force FR is achieved in particular because, as a result of the throttle, the return flow of the compressed air through the bypass line takes place substantially more slowly than the return flow of the air through the first selection valve port. In a bypass line with a bypass check valve, the additional control pressure—which has reached the second selection valve port via the bypass line—for generating the return force is held at the second selection valve port—even after the pressure at the first selection valve port has fallen—because a return flow is prevented by the bypass check valve.

In particular, it is provided that the additional control pressure is formed by a front axle brake pressure or a rear axle brake pressure or a trailer brake pressure or is derived from one of those brake pressures. In such a further embodiment, a brake pressure that is already present—in particular in a service brake system—can advantageously be used as the additional control pressure for operating the parking brake cylinders. In particular, it is provided that the additional brake pressure port can be pneumatically connected to a front axle modulator and/or rear axle modulator and/or trailer control valve. Where the additional brake pressure port is pneumatically connected to a front axle modulator, a front axle brake pressure can advantageously be used as the additional control pressure. Where the additional brake pressure port is pneumatically connected to a rear axle modulator, a rear axle brake pressure can advantageously be used as the additional control pressure. Where the additional brake pressure port is pneumatically connected to a trailer control valve, a trailer brake pressure can advantageously be used as the additional control pressure.

In order to achieve the object, the disclosure further provides in a third aspect an electronically controllable pneumatic brake system having a central control unit, at least one axle modulator, a brake signal transmitter and at least one spring-loaded brake cylinder, having an electropneumatic parking brake module according to the first aspect of the disclosure, configured to carry out a method according to the second aspect of the disclosure. In the case of the brake system, the advantages of the electropneumatic parking brake module and/or of the method are advantageously used.

In a further embodiment of the electronically controllable pneumatic brake system it is provided that the additional brake pressure port of the electropneumatic parking brake module can be pneumatically connected to a front axle modulator or a rear axle modulator or to a trailer control valve for the provision of an additional control pressure. In particular, the additional brake pressure port of the electropneumatic parking brake module is pneumatically connected to the rear axle modulator via an additional actuating line. In particular, the additional brake pressure port of the electropneumatic parking brake module is pneumatically connected to the front axle modulator via a further additional actuating line. In particular, the additional brake pressure port of the electropneumatic parking brake module is pneumatically connected to the trailer control valve via yet a further additional actuating line.

In a fourth aspect, the disclosure further provides, for achieving the object, a vehicle, in particular a commercial vehicle, having an electropneumatic parking brake module according to the first aspect of the disclosure, in particular having a brake system according to the third aspect of the disclosure. In the case of the vehicle, the advantages of the electropneumatic parking brake module and/or of the method and/or of the electronically controllable pneumatic brake system are advantageously used.

In a fifth aspect of the disclosure there is further provided an electropneumatic parking brake module for an electronically controllable pneumatic brake system for a vehicle, in particular a commercial vehicle, having
   a supply port for receiving a supply pressure,
   at least one parking brake port for the connection of at least one parking brake cylinder,
   a main valve unit which receives the supply pressure and is configured to output a spring brake pressure at the parking brake port in dependence on a control pressure, and
   a pilot valve assembly which receives the supply pressure and is to provide the control pressure, wherein the pilot valve assembly has a bistable valve which can be switched between a first air admission position and a second air release position,
   and a control unit for providing first and second switch signals (S1, S2) to the pilot valve assembly,
characterized in that
   the pilot valve assembly has a monostable holding valve which is pneumatically connected in series with the bistable valve and is arranged in a control line of the main valve unit, wherein the holding valve is normally open in an open position, and the control unit is configured to hold the holding valve in the holding position via the first switch signal in order to hold the control pressure, and a selection valve unit having a first selection valve port for receiving an additional control pressure provided at an additional brake pressure port is arranged in the control line between the main valve and a control port of the main valve unit, wherein the selection valve unit has a check characteristic at the first selection valve port, such that the first selection valve port opens in a direction of flow from the additional brake pressure port via a third selection valve port to the control port and closes contrary to the direction of flow.

In a sixth aspect of the disclosure there is further provided a method for operating an electropneumatic parking brake module according to the fifth aspect of the disclosure, including the step:

filling the parking brake cylinder by pressurizing the control port of the main valve assembly in order to output the spring brake pressure at the parking brake port in dependence on the control pressure, characterized in that the pressurization of the control port is effected via an additional control pressure which is provided at the additional brake pressure port and is received via the selection valve unit, wherein for the pressurization and for subsequently holding the additional control pressure at the control port, the holding valve is held in the holding position.

It will be appreciated that the method according to the first aspect of the disclosure, the electropneumatic parking brake module according to the second aspect of the disclosure, the brake system according to the third aspect of the disclosure, the vehicle according to the fourth aspect of the disclosure, the electropneumatic parking brake module according to the fifth aspect of the disclosure and the method according to the sixth aspect of the disclosure have identical and similar sub-aspects. In this respect, for the further embodiment of one aspect of the disclosure, reference is also made to the further embodiments of the other aspects of the disclosure.

BRIEF DESCRIPTION OF THE DRAWINGS

The invention will now be described with reference to the drawings wherein.

DESCRIPTION OF THE PREFERRED EMBODIMENTS

Figure 1:
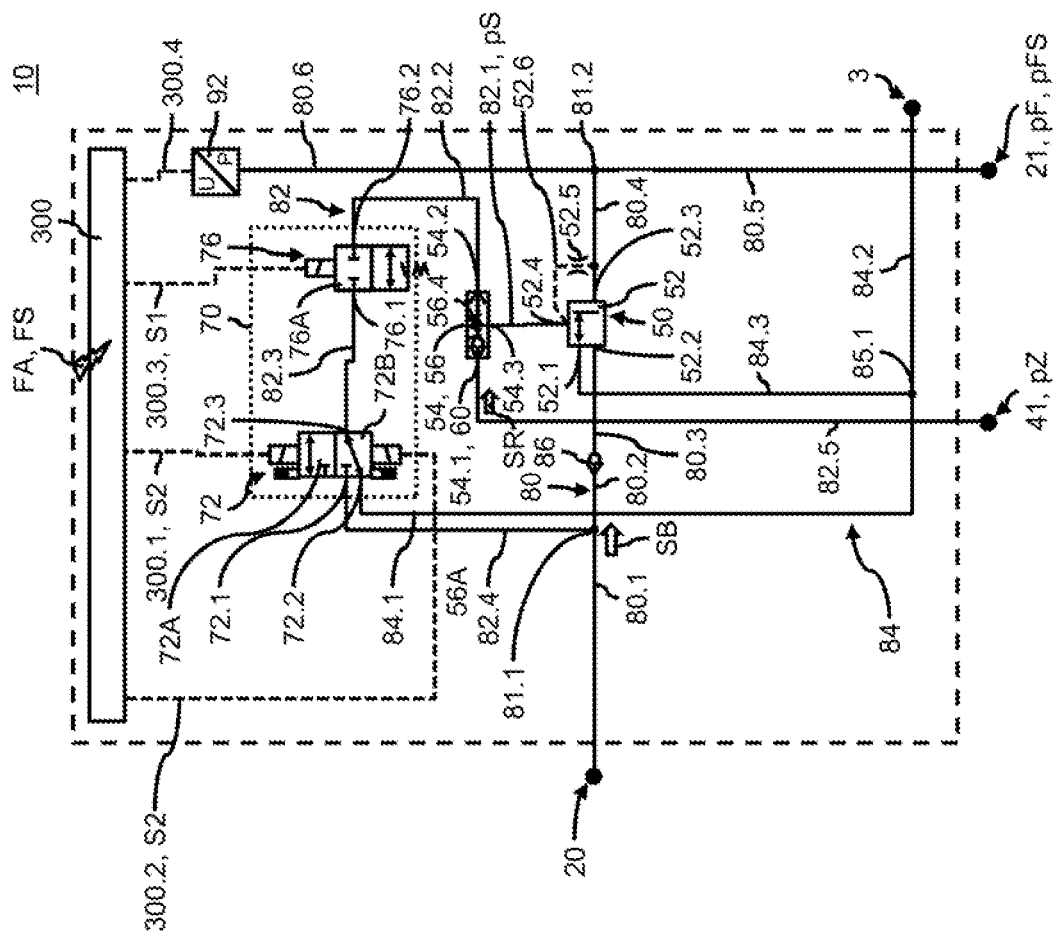
FIG. 1 shows an electropneumatic parking brake module according to the disclosure.

FIG. 1 shows an electropneumatic parking brake module 10 according to a further embodiment of the disclosure. A supply port 20, to which a first main line portion 80.1 of a main line 80 is connected, is configured to receive compressed air for the electropneumatic parking brake module 10. Further along the main line 80, between a second main line portion 80.2 and a third main line portion 80.3, there is arranged a main line check valve 86, which is configured to open in the filling direction, that is, in the direction of a filling stream SB flowing from the supply port 20 into the main line 80, and to close in the opposite direction.

A relay valve 52 of a main valve unit 50 is connected to the third main line portion 80.3, wherein the relay valve 52 is connected to the third main line portion 80.3 via a second main valve port 52.2. The relay valve 52 is configured, by the corresponding pressurization of a control port 52.4, to pneumatically connect the second main valve port 52.2 and a third main valve port 52.3 in order to output a spring brake pressure pF at the third main valve port 52.3. The third main valve port 52.3 is in turn connected to a fourth main line portion 80.4. Via a second main line branch 81.2, the fourth main line portion 80.4 is connected on the one hand via a sixth main line portion 80.6 to a pressure sensor 92 and on the other hand—in order to provide the spring brake pressure pF—via a fifth main line portion 80.5 to a parking brake port 21.

The main line 80 has between its first main line portion 80.1 and the second main line portion 80.2 a first main line branch 81.1, from which a fourth control line portion 82.4 of a control line 82 leads to a first bistable valve port 72.1 of a bistable valve 72 of a pilot valve assembly 70.

The bistable valve 72 of the pilot valve assembly 70 is in the form of a bistable 3/2-way solenoid valve, which in the present case is shown in an air release position 72B. The bistable valve 72 is configured in an air admission position 72A—not shown here—to produce a pneumatic connection between the first bistable valve port 72.1 and a third bistable valve port 72.3.

The pilot valve assembly 70 has a holding valve 76. The third bistable valve port 72.3 is connected via a third control line portion 82.3 of the control line 82 to a first holding valve port 76.1 of the holding valve 76. The pilot valve assembly 70 can be in the form of a structural unit, but it is also possible that the bistable valve 72 and the holding valve 76 are in the form of independent components.

The holding valve 76 is in the present case in the form of a 2/2-way solenoid valve which is normally open and in the present case is shown in its holding position 76A. In the holding position 76A, which is present in particular when the holding valve 76 is energized, the pneumatic connection between the first holding valve port 76.1 and a second holding valve port 76.2 is disconnected.

A second control line portion 82.2 is connected to the second holding valve port 76.2. The second control line portion 82.2 is in turn pneumatically connected to a second selection valve port 54.2 of a selection valve unit 54—which in the present case is in the form of a shuttle valve 56. The shuttle valve 56 has a biasing spring 56.4 which presses a valve body 56.5 with a spring force against a first selection valve port 54.1 and thus holds the shuttle valve 56 in a spring-biased manner in a first valve position 54A (see FIG. 2B). In the valve position 54A, the second selection valve port 54.2 is pneumatically connected to the third selection valve port 54.3.

A first control line portion 82.1 is connected to the third selection valve port 54.3 and is in turn pneumatically connected to the control port 52.4 of the relay valve 52. By pressurization of the control port 52.4, the relay valve 52 can be actuated to output the spring brake pressure pF at the third main valve port 52.3.

Via the selection valve unit 54, a further, alternative compressed air source can be connected to the control port 52.4 for the purpose of actuating the relay valve 52. For this purpose, an additional brake pressure port 41 is in the present case pneumatically connected via a fifth control line portion 82.5 to the first selection valve port 54.1. The first selection valve port 54.1 is an additional input port 60 via which an additional control pressure pZ provided at the additional brake pressure port 41 is received.

With the shuttle valve 56 in the configuration shown here, that of the first and second selection valve ports 54.1, 54.2 at which the higher pressure prevails is always pneumatically connected to the third selection valve port 54.3. The respective other selection valve port 54.1, 54.2 is always closed by the valve body 54.5, in accordance with the operating principle of a shuttle valve, so that the two pressures present at the two selection valve ports 54.1, 54.2 are not added together, and thus there is not a possibly damaging excessive pressure increase at the control port 52.4.

In further embodiments of the disclosure, the additional input port 60, in particular the selection valve unit 54, can be configured differently, for example as shown in FIGS. 2A to 2D.

A first air release line portion 84.1 of an air release line 84 is connected to a second bistable valve port 72.2 of the bistable valve 72. In an air release position 72B of the bistable valve, the third bistable valve port 72.3 is pneumatically connected to the second bistable valve port 72.2. In this air release position 72B, the third control line portion 82.3 of the control line 82 is thus pneumatically connected to the first air release line portion 84.1.

A second air release line portion 84.2 is connected to the first air release line portion 84.1 and is in turn connected to an air release port 3 of the electropneumatic parking brake module 10. A third air release line portion 84.3 extends from a first main valve port 52.1 of the relay valve 52 to an air release line junction 85.1, wherein the air release line junction 85.1 is arranged in the air release line 84 between the first air release line portion 84.1 and the second air release line portion 84.2.

The relay valve 52 further has a throttle 52.5 in a main valve bypass line 52.6, wherein the main valve bypass line 52.6 is configured to produce a pneumatic connection between the third main valve port 54.3 facing the parking brake port 21 and a control port 54.4. Owing to the throttle 52.5, the pneumatic connection is configured with a relatively small nominal width in order, in the event of a drop, caused by leakage, in the pressure at the control port 54.4, in particular in the control pressure pS provided in the form of the additional control pressure pZ, to adjust it to the level of the outputted spring brake pressure pF again by relatively slow flow.

With a system shown in FIG. 1, it is possible to provide a failure braking functionality, that is, a functionality for braking a vehicle if there is a power failure or a fault signal of a control unit 300. The provision of the failure braking functionality is effected by maintaining a control pressure pS at the control port 52.4 of the relay valve, via which air is admitted to at least one parking brake cylinder 24 in order to release the parking brake. When a failure braking situation occurs, in particular if there is a power failure or a fault signal of the control unit 300, air is accordingly released from the parking brake cylinders 24 by the release of air from the control port 52.4 in order to activate the parking brake. The control pressure pS is provided in particular in the form of the additional control pressure pZ via the additional brake pressure port.

According to the concept of the disclosure, the release of air from the control port 52.4 is made possible via the holding valve 76, which in the event of a power failure FS or a fault FA of the control unit 300 is automatically de-energized and opens.

Because an additional input port 60, in particular a selection valve unit 54, is provided according to the disclosure, air can be admitted to the control port 52.4 of the relay valve 52, that is, the control port can be pressurized with compressed air, in particular even if the bistable valve 72 has been switched to the air release position 72B.

By a combination of the holding valve 76 and an additional input port 60, in particular a selection valve unit 54, air can thus be admitted to and released from the control port 52.4 of the relay valve 52, in particular without having to switch the bistable valve 72 into the air admission position 72A.

This combination advantageously prevents a situation in which a power failure or a fault signal of the control unit 300 occurs at a time at which the bistable valve 72 is still in the air admission position 72A and thus it would not be possible to release air from the control port 52.4 in order to generate failure braking because in this case a pneumatic connection could not be produced between the control port 52.4 and the air release port 3.

Failure braking generated by the parking brake is suitable in particular for operation of the vehicle at low speeds, for example of about 10 km/h, which occur, for example, in automatic driving operation of a vehicle.

Figure 2A:
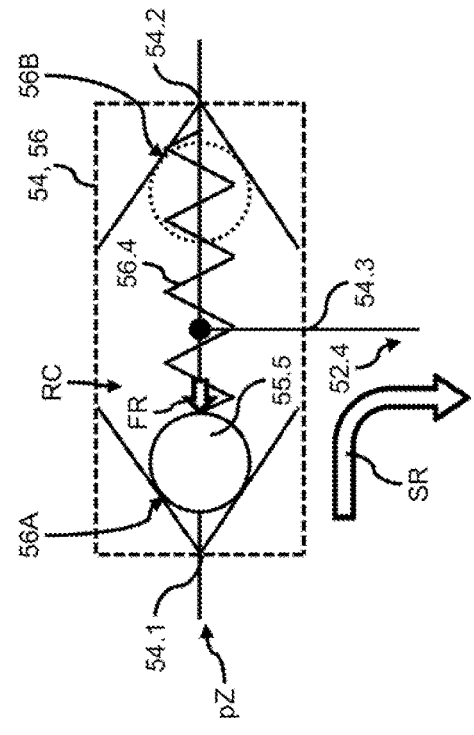
FIGS. 2A to 2D show various further embodiments of a selection valve unit.

In FIGS. 2A, 2B, 2C and 2D, different further embodiments of a selection valve unit 54 are shown. In FIG. 2A, a first further embodiment of a selection valve unit 54, which has a check valve 55, is shown. The check valve 55 is arranged at the first selection valve port 54.1 in such a manner that a flow of air flowing in the direction of flow SR, that is, a flow of air flowing from the first selection valve port 54.1 into the selection valve unit 54, is able to pass through, but a flow of air in the opposite direction is prevented by the sealing placement of a valve body 55.5. The valve body 55.5 is thereby pressed in a sealing manner with a return force FR against the first selection valve port 54.1 by a check valve biasing spring 55.4. In the present case, the check valve 55 implements a check characteristic RC, which ensures that, even if there is no pressure at the first selection valve port 54.1 or a lower pressure than at a second selection valve port 54.2, the control pressure pS present at that time at the control port 52.4 can be held.

Figure 2B:
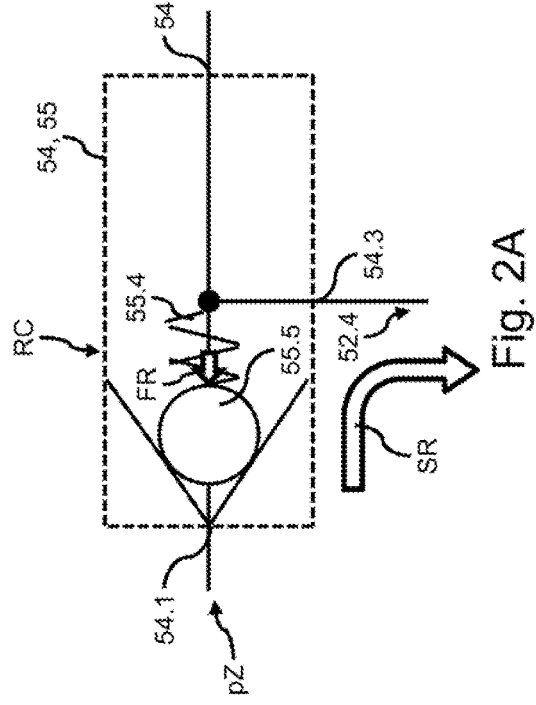

In FIG. 2B, the selection valve unit 54 has a shuttle valve 56. Analogously to the further embodiment shown in FIG. 2A, this selection valve unit 54 also has a check characteristic RC owing to a valve body 55.5 which is pressed in a sealing manner under a return force FR against the first selection valve port 54.1 via a further biasing spring 56.4. However, the further embodiment shown in FIG. 2B is further configured such that the valve body 55.5 can be pressed via an additional control pressure pZ present at the first selection valve port 54.1 against the second selection valve port 54.2 and thus closes the second selection valve port in a sealing manner. If the additional control pressure pZ present at the first selection valve port 54.1 is higher than a pressure present at the second selection valve port 54.2 and in addition the return force FR of the biasing spring 56.4 is also overcome, then the valve body 55.5 is correspondingly pressed in a sealing manner against the second selection valve port 54.2.

In the case of a shuttle valve 56, it is advantageously achieved that a pressure present at the first selection valve port 54.1 and in addition a pressure present at the second selection valve port 54.2 are not added together, since the port at which the lower pressure is present is always closed by the valve body 55.5. Thus, the risk of an excessive and possibly damaging pressure at the control port 52.4 can be reduced.

Figure 2C:
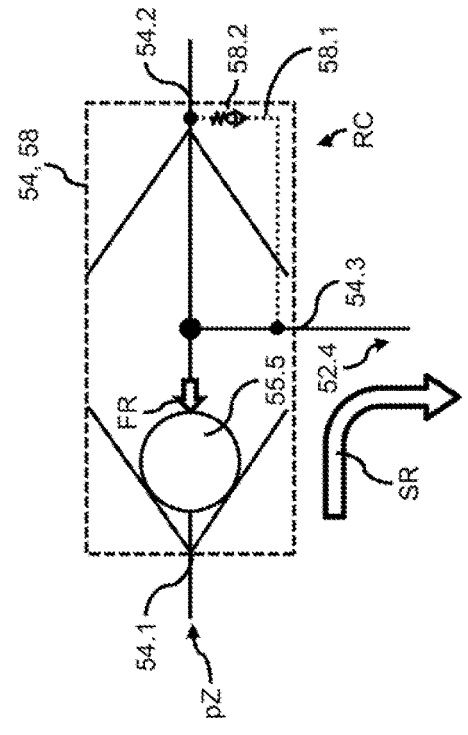

The further embodiment shown in FIG. 2C of a selection valve unit 54 has a further shuttle valve 57, which has a bypass line 57.1 for generating a return force FR. The bypass line 57.1 pneumatically connects the second and third selection valve ports 54.2, 54.3 in order to produce a deliberate leakage. This has the result that, when air is admitted via the first selection valve port 54.1, in which case the valve body 55.5 is pressed against the second selection valve port 54.2, the additional control pressure pZ present at the first selection valve port 54.1 can also be established at the second selection valve port 54.2 via the bypass line 57.1. By further providing a throttle 57.2 in the bypass line 57.1, it can advantageously be ensured that, after a drop in the pressure, in particular the additional control pressure pZ, at the first selection valve port 54.1, a return force FR presses the valve body 55.5 in a sealing manner against the first selection valve port 54.1 as a result of the additional control pressure pZ now present at the second selection valve port 54.2 approximately at the level of the—previously present—additional control pressure pZ. Generation of the return force FR is in particular achieved because, as a result of the throttle 57.2, a return flow of the compressed air through the bypass line 57.1 takes place substantially more slowly than the return flow of the air through the first selection valve port 54.1.

Figure 2D:
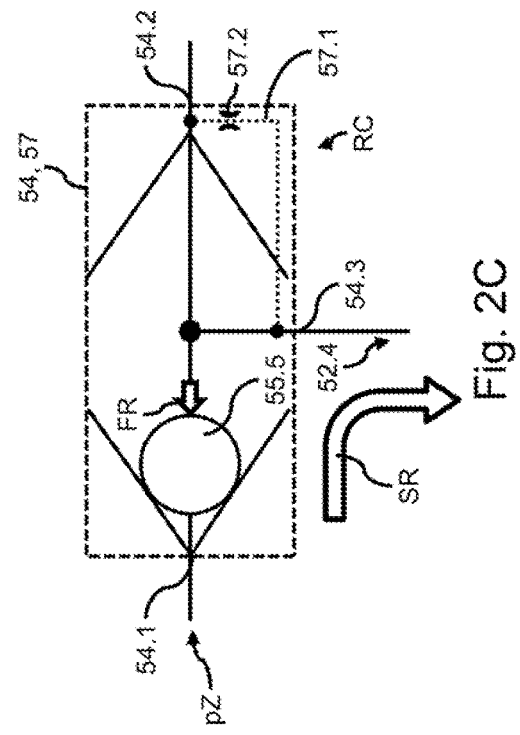

In the further embodiment shown in FIG. 2D having yet a further shuttle valve 58, a deliberate leakage is likewise produced by a further bypass line 58.1—connecting the second and third selection valve ports 54.2, 54.3—in order to generate a return force FR. However, a bypass check valve 58.2—instead of a throttle—is here provided in the further bypass line 58.1. Via the bypass check valve 58.2 it is achieved that, when air is admitted to the selection valve unit 54 via the first selection valve port 54.1, compressed air can flow—despite the sealing placement of the valve body 55.5 on the second selection valve port 54.2—via the further bypass line 58.1 to the second selection valve port 54.2, but the further bypass line 58.1 is closed in the opposite direction. Thus, it is ensured that, if the pressure at the first selection valve port 54.1 falls, the additional control pressure pZ which has previously reached the second selection valve port 54.2 via the further bypass line 58.1 and is held there via the bypass check valve 58.2 again presses the valve body 55.5 in a sealing manner against the first selection valve port 54.1, wherein a return force FR is generated by the pressure difference that is generated between the first and second selection valve ports 54.1, 54.2.

Figure 3:
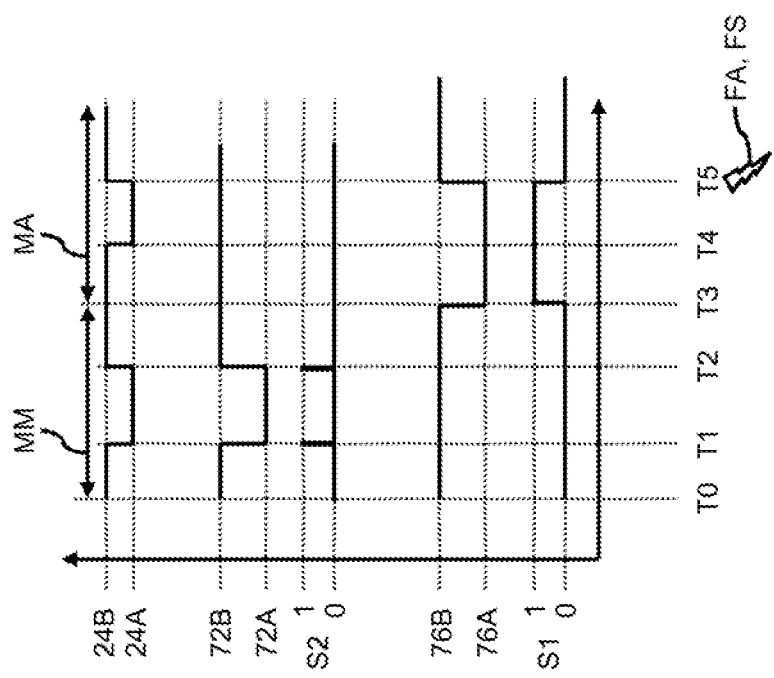
FIG. 3 shows a diagrammatic profile over time with different switch positions of the parking brake, bistable valve and holding valve.

In FIG. 3, a diagrammatic sequence of different switch positions 72A, 72B of a bistable valve 72 and switch positions 76A, 76B of a holding valve 76 of an electropneumatic parking brake module 10 is shown. At an initial time T0, a vehicle, not shown here, is in a manual operating mode MM, in which a parking brake of the vehicle is generally operated by a bistable valve 72 and the holding valve 76 is accordingly permanently in an open position 76B. In the manual operating mode MM, the holding valve 76 is therefore not actuated, that is, a first switch signal S1 is 0 and the holding valve 76 is open when it is not actuated, in particular not energized. At the initial time T0, the bistable valve 72 is in an air release position 72B, in which air is correspondingly released from the control port 52.4 of the relay valve 52 via the air release port 3, and thus no spring brake pressure pF is provided at the parking brake port 21, whereby the vehicle is braked via at least one parking brake cylinder 24—in a braking position 24B (see FIG. 4). Owing to the braking action of the air release position 72B on the parking brake, the air release position 72B is also referred to as the parking brake position. As an example of the manual operating mode MM, it is shown how, at a first time T1, the bistable valve is switched from the air release position 72B into an air admission position 72A via a one-time actuation via a second switch signal S2. After time T1, the parking brake is thus released and the parking brake cylinder 24 is in a release position 24A. Accordingly, the vehicle in the manual mode can be moved normally, in particular by a human driver, and can be braked during operation in particular via a service brake system 206.

At a second time T2, the journey is complete and the bistable valve 72 is moved into its air release position 72B again via a one-time actuation by the second control signal S2, whereby the at least one parking brake cylinder 24 is actuated and the vehicle is braked. The bistable valve 72, in accordance with its operating principle, is always actuated only for switching and then remains in its switched state without actuation.

At a third time T3, an automatic operating mode MA is initiated, in which, according to the concept of the disclosure, a failure braking functionality is provided. The automatic operating mode MA can be used in particular in the case of the autonomous or automated driving of a vehicle at a relatively low speed, for example in a maneuvering operation in a demarcated area or the like.

For this purpose, the bistable valve 72 is in its air release position 72B—releasing air from the parking brake cylinder 24—and does not have to be switched during the automatic operating mode MA. By contrast, the holding valve 76 is switched at the third time T3 from its open position 76B into its holding position 76A by actuation via the first switch signal S1 and is held in the holding position 76A by corresponding continuous actuation via the first switch signal S1.

At a fourth time T4, an additional control pressure pZ is provided at the control port 52.4 via an additional brake pressure port 41 and a selection valve unit 54, whereby the relay valve 52 outputs a corresponding spring brake pressure pF for releasing the at least one parking brake cylinder 24 and thus releases the parking brake FB.

Even after the pressure at the additional brake pressure port 41 has fallen, the additional control pressure pZ is held—owing to the check characteristic RC of the selection valve unit 54 and the holding valve 76 in its holding position 76A.

The holding valve 76 in the holding position 76A thus takes over the function of the bistable valve 72 in that, in the automatic operating mode MA, it holds a control pressure pS at the control port 52.4 of the relay valve 52 in order to hold the parking brake cylinder 24 in a release position 24A.

At a fifth time T5, a fault FA or a power failure FS of the control unit 300 occurs during the automatic operating mode MA. According to the concept of the disclosure, the first switch signal S1 disappears at this moment, whereby the holding valve 76 automatically jumps from its holding position 76A back into its open position 76B and air is released from the parking brake cylinder 24, which is thus moved into its braking position 24B in order to perform failure braking.

Figure 4:
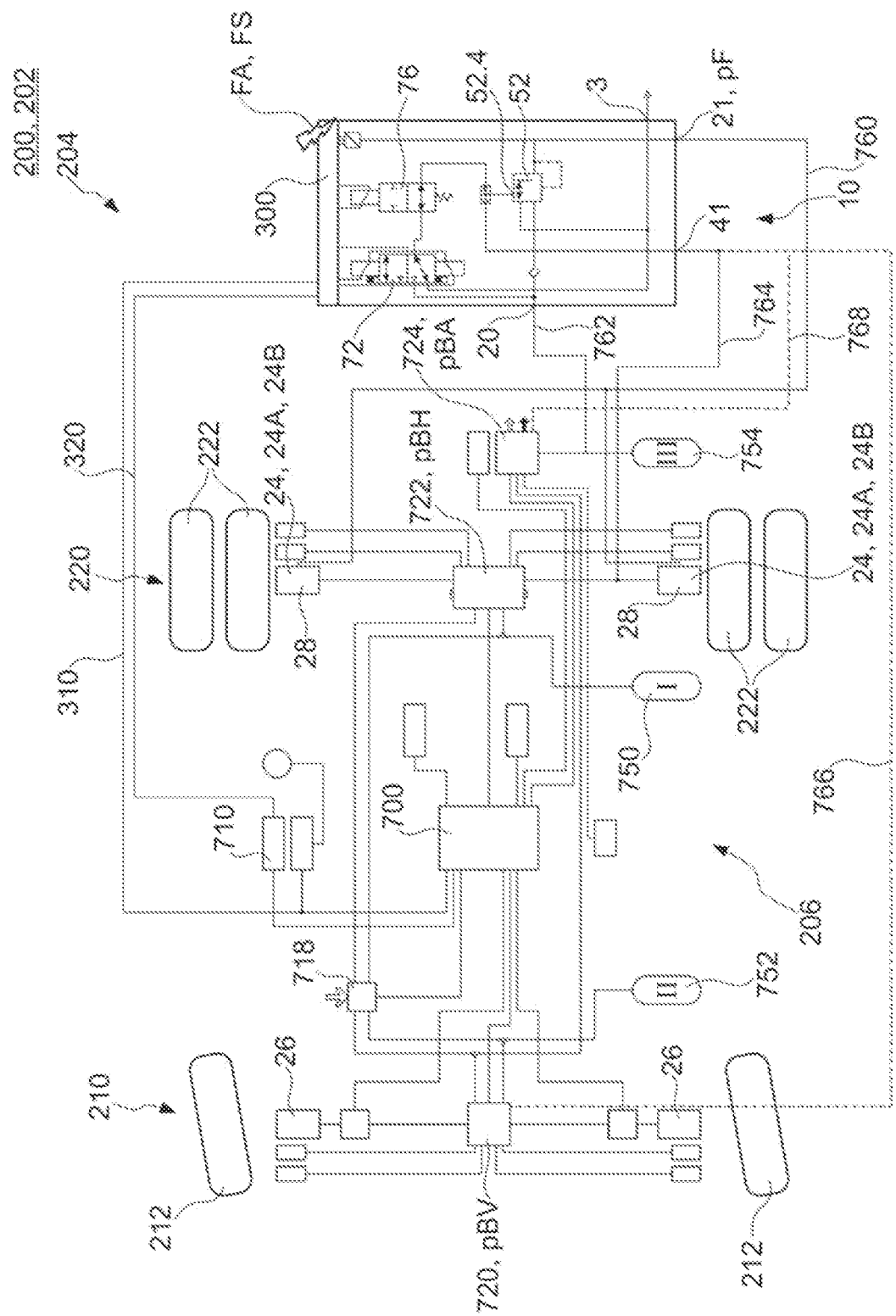
FIG. 4 shows a brake system having an electropneumatic parking brake module according to the disclosure.

FIG. 4 shows an electronically controllable pneumatic brake system 204. The electronically controllable pneumatic brake system 204 is in the present case used in a vehicle 200 in the form of a commercial vehicle 202, which is shown here in highly diagrammatic form, in particular with two front wheels 212 of a front axle 210 and four rear wheels 222 of a rear axle 220.

A central control unit 700 is connected in a signal-carrying manner via a central control line 310 to a control unit 300 of the electropneumatic parking brake module 10. The control unit 300 is further supplied by a power supply 710 via a supply line 320.

Two service brake cylinders 26, which are each associated with a front wheel 212 of the front axle 210, can be actuated for braking operation via a brake signal transmitter 718, wherein compressed air from a second compressed air reservoir 752 is admitted to the service brake cylinders 26 via a front axle modulator 720 in that the front axle modulator 720 provides a front axle brake pressure pBV.

Analogously, two parking brake cylinders 24, which are each associated with the rear wheels 222 of the rear axle 220, can have a service brake chamber 28 which, under the control of the brake signal transmitter 718, can be pressurized via a rear axle modulator 722 with compressed air from a first compressed air reservoir 750 for the purpose of braking. For this purpose, the rear axle modulator 722 provides a rear axle brake pressure pBH.

Furthermore, the brake system 204 has a trailer control valve 724 for providing a trailer brake pressure pBA, which can be pneumatically connected to a trailer, not shown here, of the vehicle 200 in order to supply a brake system of the trailer.

The two parking brake cylinders 24 each have a spring-loaded brake and are pneumatically connected via a parking brake line 760 to a parking brake port 21 of the electropneumatic parking brake module 10.

Via the electropneumatic parking brake module 10, a spring brake pressure pF can be provided to the parking brake cylinders 24 in order to admit air to the parking brake cylinders 24 and thus move them from a braking position 24B into a release position 24A.

Compressed air from a third compressed air reservoir 754 is provided to the electropneumatic parking brake module 10 via a compressed air supply line 762 and a supply port 20. Both in the manual operating mode MM and in the automatic operating mode MA, the parking brake cylinders 24 are supplied with compressed air from the third compressed air reservoir 754 via the supply port 20, in order to switch them into the release position 24A. However, actuation of the relay valve 52 to output the spring brake pressure pF takes place in the manual operating mode MM by switching the bistable valve 72 in order to pressurize the control port 52.4 of the relay valve 52 with pressure from the third compressed air reservoir 754. By contrast, in the automatic operating mode MA, pressurization of the control port 52.4 in order to actuate the relay valve 52 takes place via an additional brake pressure port 41, which in the present case is fed by the first compressed air reservoir 750 via an additional actuating line 764. Via the rear axle modulator 722, the rear axle brake pressure pBH can be provided via the additional actuating line 764 as additional control pressure pZ at the additional brake pressure port 41, wherein the rear axle modulator 722 can be actuated by the central control unit 700 in the automatic operating mode MA—in order selectively to provide the rear axle brake pressure pBH as the additional control pressure pZ.

Additionally or alternatively, a further additional actuating line 766 can be provided, which pneumatically connects the front axle modulator 720 to the additional brake pressure port 41 in order to provide the front axle brake pressure pBV as the additional control pressure pZ at the additional brake pressure port 41.

Additionally or alternatively, yet a further additional actuating line 768 can be provided, which pneumatically connects the trailer control valve 724 to the additional brake pressure port 41 in order to provide the trailer brake pressure pBA as the additional brake pressure pZ at the additional brake pressure port 41.

The control unit 300 is supplied with power by a power supply 710 via a supply line 320.

In the control unit 300, a power failure FS can occur if there is a fault in the power supply 710 and/or in the supply line 320. Furthermore, a fault FA can occur in the control unit 300 if the safety of the vehicle can no longer be ensured by the control unit 300 and/or the central control unit 700. Such a case can be present, for example, if sensor information that is relevant for the driving operation is missing or if contradictory sensor information is present, or if a state based on sensor information cannot be processed by the control logic.

Figure 5:
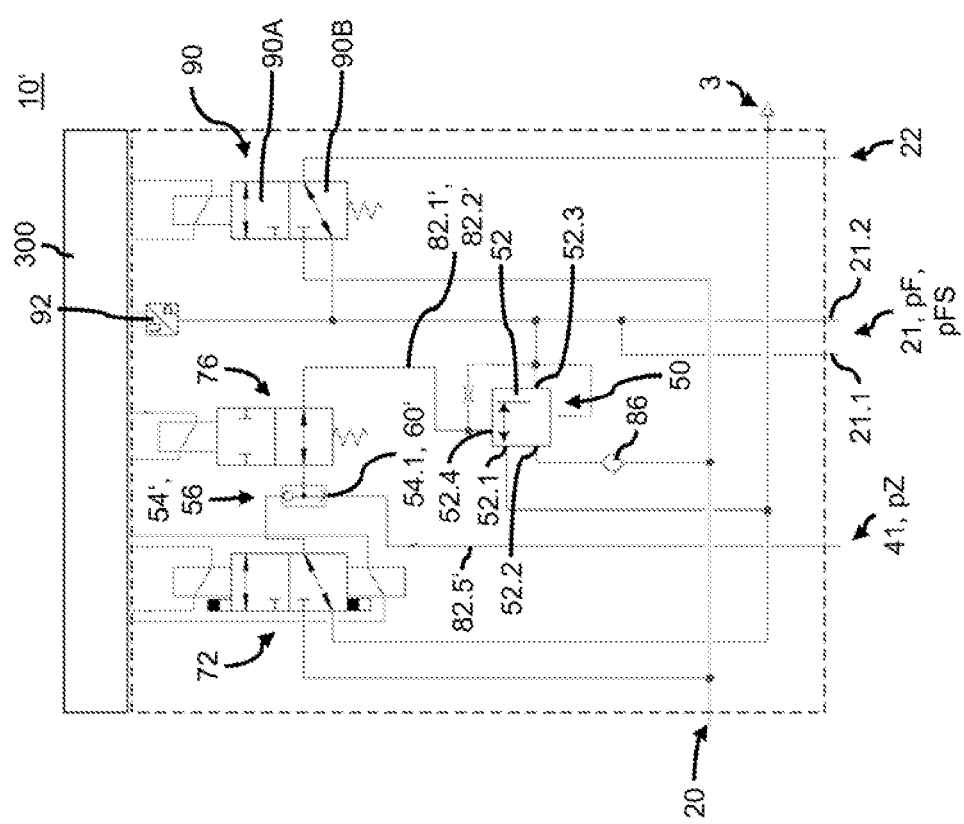
FIG. 5 shows a further embodiment of an electropneumatic parking brake module according to the disclosure; and, FIG. 6 shows yet a further embodiment of an electropneumatic parking brake module according to the disclosure.

FIG. 5 shows a further embodiment of an electropneumatic parking brake module 10' according to the disclosure. In the electropneumatic parking brake module 10', the additional input port 60' is formed as the first selection valve port 54.1 of a further selection valve assembly 54' in the form of a shuttle valve 56. In contrast to the embodiment shown in FIG. 1, the further selection valve assembly 54' is arranged in the third control line portion 82.3', namely between the bistable valve 72 and the holding valve 76. Accordingly, a first control line portion 82.1' and a second control line portion 82.2' are in the form of a common control line portion which pneumatically connects the holding valve 76 to the control port 52.4 of the relay valve 52 of the main valve assembly 50. In the present case, the parking brake port 21 has a first parking brake port 21.1 and a second parking brake port 21.2. In all the embodiments, the parking brake port 21 can also be in the form of a single parking brake port 21, as shown, for example, in FIG. 1.

Figure 6:
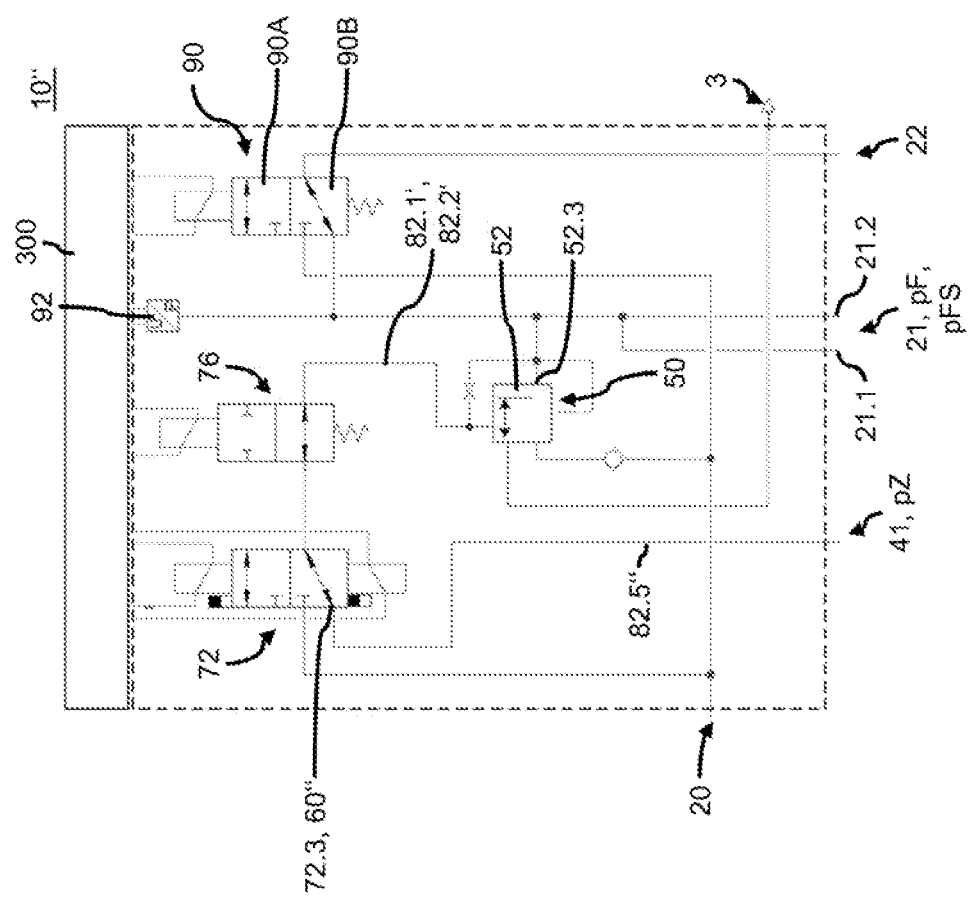

FIG. 6 shows yet a further embodiment of an electropneumatic parking brake module 10" according to the disclosure. In the electropneumatic parking brake module 10", the additional input port 60" is in the form of a third bistable valve port 72.3 of the bistable valve 72. In this further embodiment, the third bistable valve port 72.3 is thus not used or not only used for air release but is pneumatically connected via a fifth control line portion 82.5" to the additional brake pressure control port 41 for receiving an additional control pressure pZ. Analogously to the further embodiment shown in FIG. 5, a first control line portion 82.1" and a second control line portion 82.2" are here in the form of a common control line portion.

The further embodiment of the electropneumatic parking brake module 10' shown in FIG. 5 and the further embodiment of the electropneumatic parking brake module 10" shown in FIG. 6 can optionally have a trailer valve 90, which is preferably in the form of a 3/2-way valve, particularly preferably in the form of a 3/2-way solenoid valve. The trailer valve is configured in particular to pneumatically connect the supply port 1 to a trailer port 22 in a first, supply position 90A and to pneumatically connect the third main valve port 52.3 to the trailer port 22 in a second, control position 90B. Via a trailer valve 90, a trailer connected to a vehicle 200 can advantageously be supplied with compressed air, in particular either with a supply pressure pV or with a spring brake pressure pF. Via a trailer valve 90, a parking brake of the trailer can in particular be supplied with a spring brake pressure pF.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

3 air release port
10 electropneumatic parking brake module
20 supply port
21 parking brake port
21.1, 21.2 first, second parking brake port
22 trailer port
24 parking brake cylinder
24A release position
24B braking position
26 service brake cylinder
28 service brake chamber
41 additional brake pressure port
50 main valve unit
52 relay valve
52.1 first main valve port
52.2 second main valve port
52.3 third main valve port
52.4 control port
52.5 throttle
52.6 main valve bypass line
54 selection valve unit
54.1 first selection valve port
54.2 second selection valve port
54.3 third selection valve port
54.4 control port
54.5 valve body
54A, 54B valve position of the selection valve unit
55 check valve
55.4 check valve biasing spring
55.5 valve body
56 shuttle valve
56.4 biasing spring
56.5 valve body
57 further shuttle valve
57.1 bypass line
57.2 throttle
58 yet further shuttle valve
58.2 bypass check valve
60 additional input port
70 pilot valve assembly
72 bistable valve
72.1 first bistable valve port
72.2 second bistable valve port
72.3 third bistable valve port
72A air admission position of the bistable valve
72B air release position of the bistable valve
76 holding valve
76.1 first holding valve port
76.2 second holding valve port
76A holding position
76B open position
80 main line
80.1 first main line portion
80.2 second main line portion
80.3 third main line portion
80.4 fourth main line portion
80.5 fifth main line portion
80.6 sixth main line portion
81.1 first main line branch
81.2 second main line branch
82 control line
82.1 first control line portion
82.2 second control line portion
82.3 third control line portion
82.4 fourth control line portion
82.5 fifth control line portion
84 air release line
84.1 first air release line portion
84.2 second air release line portion
84.3 third air release line portion
85.1 air release line junction
86 main line check valve
90 trailer valve
90.1 first trailer valve port
90.2 second trailer valve port
90.3 third trailer valve port
90A supply position of the trailer valve
90B control position of the trailer valve
92 pressure sensor
200 vehicle
202 commercial vehicle
204 brake system
206 service brake system
210 front axle
212 front wheels
220 rear axle
222 rear wheels
300 control unit
310 central control unit
320 supply line
700 central control unit
710 power supply
718 brake signal transmitter
720 front axle modulator
722 rear axle modulator
724 trailer control valve
750 first compressed air reservoir
752 second compressed air reservoir
754 third compressed air reservoir
760 parking brake line
762 compressed air supply line
764 additional actuating line
766 further additional actuating line
768 yet further additional actuating line
820 compressed air reservoir
BEF filling state
FA error
FB parking brake
FR return force
FS power failure
MA automatic operating mode
MM manual operating mode
pBA trailer brake pressure
pBH rear axle brake pressure
pBV front axle brake pressure
pF spring brake pressure
pFS desired spring brake pressure
pHA rear axle brake pressure
pS control pressure pV supply pressure
pZ additional control pressure
RC check characteristic
S1 first switch signal
S2 second switch signal
SB filling stream
SR direction of flow
T0 initial time
T1 first time
T2 second time
T3 third time
T4 fourth time
T5 fifth time

What is claimed is:

1. A method for operating an electropneumatic parking brake module for an electronically controllable pneumatic brake system for a vehicle having a supply port for receiving a supply pressure and a parking brake port for a connection of at least one parking brake cylinder, the vehicle further having a main valve assembly configured to receive the supply pressure and being configured to output a spring brake pressure at the parking brake port in dependence upon a control pressure, the vehicle further having a pilot valve assembly configured to receive the supply pressure and to provide the control pressure, wherein the pilot valve assembly has a bistable valve which can be switched between a first air admission position and a second air release position, the vehicle having a control unit configured to provide a first switch signal and a second switch signal to the pilot valve assembly, the pilot valve assembly having a monostable holding valve pneumatically connected in series with the bistable valve and arranged in a control line of the main valve assembly, wherein the holding valve is normally open in an open position, the control unit being configured to hold the holding valve in a holding position via the first switch signal in order to hold the control pressure, the vehicle having an additional input port for receiving an additional control pressure provided at an additional brake pressure port arranged in the control line, the method comprising:
filling the at least one parking brake cylinder by pressurizing a control port of the main valve assembly in order to output the spring brake pressure at the parking brake port in dependence on the control pressure, wherein the pressurization of the control port is effected via an additional control pressure provided at the additional brake pressure port and is received via the additional input port;
wherein the holding valve automatically switches into an open position for releasing air from the control port in the event of at least one of a fault in an electronic component and a power failure, wherein air is released from the control port of the main valve assembly for the release of air from the parking brake port independent of the bistable valve; and,
wherein the holding valve is held in the holding position for holding the additional control pressure at the control port such that pressure is stored in a portion of the control line connecting a holding valve port of the holding valve to the control port, wherein the pressure stored in the portion of the control line enables the parking brake module to hold a parking brake in a released position.

2. The method of claim 1, wherein, for pressurizing the control port with the additional control pressure, the holding valve is switched into the open position.

3. The method of claim 1, wherein, for pressurizing the control port with the additional control pressure, the bistable valve is at least one of switched into the air release position and remains in the air release position.

4. The method of claim 1, wherein the release of air from the control port further takes place via the bistable valve, wherein the bistable valve is permanently in the air release position in an automatic operating mode.

5. The method of claim 1, wherein the additional control pressure is provided by at least one of an additional brake component and an axle modulator or by a trailer control valve.

6. The method of claim 1, wherein the additional control pressure is formed by a front axle brake pressure or a rear axle brake pressure or a trailer brake pressure or is derived from one of those brake pressures.

7. The method of claim 1, wherein the pressurization of the control port via the additional control pressure is ended when a desired spring brake pressure for the spring brake pressure provided at the parking brake port is reached.

8. The method of claim 1, wherein the pressurization of the control port via the additional control pressure takes place during a pressurization time period, wherein the pressurization time period has a duration of between 0.5 and 1 second.

9. The method of claim 1, wherein the control port is pressurized via the additional control pressure again when the spring brake pressure has fallen to a value below a desired spring brake pressure.

10. The method of claim 1, wherein, before the control port is pressurized with the additional control pressure, the holding valve is switched into its holding position.

11. An electronically controllable pneumatic brake system comprising:
a central control unit;
at least one axle modulator;
a brake signal transmitter;
at least one spring-loaded brake cylinder;
an electropneumatic parking brake module having a supply port configured to receive a supply pressure, a parking brake port for a connection of at least one parking brake cylinder, and a main valve assembly configured to receive the supply pressure and being configured to output a spring brake pressure at said parking brake port in dependence upon a control pressure;
said electropneumatic parking brake module further having a pilot valve assembly configured to receive the supply pressure and to provide the control pressure, wherein said pilot valve assembly has a bistable valve which can be switched between a first air admission position and a second air release position; said electropneumatic parking brake module further having a control unit configured to provide a first switch signal and a second switch signal to said pilot valve assembly;
said pilot valve assembly having a monostable holding valve pneumatically connected in series with said bistable valve and being arranged in a control line of said main valve assembly, wherein said holding valve is normally open in an open position;
said control unit being configured to hold said holding valve in a holding position via the first switch signal in order to hold the control pressure;
an additional input port configured to receive an additional control pressure provided at an additional brake pressure port being arranged in said control line; said holding valve being configured to automatically switch into an open position for releasing air from a control port in at least one of an event of a fault in an electronic component and an event of a power failure, wherein air is released from said control port of said main valve assembly for the release of air from said parking brake port; and, said parking brake module being configured to carry out the method of claim 1.

12. The electronically controllable pneumatic brake system of claim 11, wherein said additional brake pressure port of said electropneumatic parking brake module can be pneumatically connected to a front axle modulator or a rear axle modulator or to a trailer control valve for the provision of an additional control pressure.

13. A vehicle comprising the electronically controllable brake system of claim 11.

14. An electropneumatic parking brake module for an electronically controllable pneumatic brake system for a vehicle, the electropneumatic brake module comprising:
   a supply port configured to receive a supply pressure;
   a parking brake port for a connection of at least one parking brake cylinder;
   a main valve assembly configured to receive the supply pressure and being configured to output a spring brake pressure at said parking brake port in dependence upon a control pressure;
   a pilot valve assembly configured to receive the supply pressure and to provide the control pressure, wherein said pilot valve assembly has a bistable valve which can be switched between a first air admission position and a second air release position;
   a control unit configured to provide a first switch signal and a second switch signal to said pilot valve assembly;
   said pilot valve assembly having a monostable holding valve pneumatically connected in series with said bistable valve and being arranged in a control line of said main valve assembly, wherein said holding valve is normally open in an open position;
   said control unit being configured to hold said holding valve in a holding position via the first switch signal in order to hold the control pressure;
   an additional input port configured to receive an additional control pressure provided at an additional brake pressure port being arranged in said control line;
   said holding valve being configured to automatically switch into an open position for releasing air from a control port in at least one of an event of a fault in an electronic component and an event of a power failure, wherein air is released from said control port of said main valve assembly for the release of air from said parking brake port independent of said bistable valve; and,
   wherein said holding valve is configured to be held in said holding position for holding the additional control pressure at said control port such that pressure is stored in a portion of said control line connecting a holding valve port of said holding valve to said control port, wherein the pressure stored in said portion of the control line enables the electropneumatic parking brake module to hold a parking brake in a released position.

15. The electropneumatic parking brake module of claim 14, wherein said additional input port is formed as a first selection valve port of a selection valve unit for receiving the additional control pressure; and,
   said selection valve unit has a check characteristic at said first selection valve port such that said first selection valve port opens in a direction of flow from said additional brake pressure port via a third selection valve port to said control port and closes contrary to the direction of flow.

16. The electropneumatic parking brake module of claim 15, wherein said selection valve unit is arranged between said holding valve and said control port of said main valve assembly.

17. The electropneumatic parking brake module of claim 15, wherein said selection valve unit is arranged between said bistable valve and said holding valve.

18. The electropneumatic parking brake module of claim 15, wherein said selection valve unit has a shuttle valve configured to connect said first selection valve port or a second selection valve port to said third selection valve port, wherein one of said first selection valve port and said second selection valve port has a higher pressure present thereat and said one of said first selection valve port and said second selection valve port with the higher pressure present thereat is opened.

19. The electropneumatic parking brake module of claim 18, wherein said shuttle valve has a biasing spring for a spring-loaded setting of a valve position.

20. The electropneumatic parking brake module of claim 18, wherein said shuttle valve has a biasing spring for a spring-loaded setting of the first valve position which closes said first selection valve port leading to said additional brake pressure port.

21. The electropneumatic parking brake module of claim 15, wherein at least one of said additional input port and said selection valve unit has, at said first selection valve port, a check valve which closes contrary to the direction of flow.

22. The electropneumatic parking brake module of claim 14, wherein said additional input port is formed by a third bistable valve port of said bistable valve which is pneumatically connected to said holding valve in the air release position.

23. The electropneumatic parking brake module of claim 14, wherein the additional control pressure is formed by a front axle brake pressure or a rear axle brake pressure or a trailer brake pressure or is derived from one of those brake pressures.

24. A vehicle comprising the electropneumatic parking brake module of claim 14.

25. An electropneumatic parking brake module for an electronically controllable pneumatic brake system for a vehicle, the electropneumatic brake module comprising:
   a supply port configured to receive a supply pressure;
   a parking brake port for a connection of at least one parking brake cylinder;
   a main valve assembly configured to receive the supply pressure and being configured to output a spring brake pressure at said parking brake port in dependence upon a control pressure;
   a pilot valve assembly configured to receive the supply pressure and to provide the control pressure, wherein said pilot valve assembly has a bistable valve which can be switched between a first air admission position and a second air release position;
   a control unit configured to provide a first switch signal and a second switch signal to said pilot valve assembly;
   said pilot valve assembly having a monostable holding valve pneumatically connected in series with said bistable valve and being arranged in a control line of said main valve assembly, wherein said holding valve is normally open in an open position;

said control unit being configured to hold said holding valve in a holding position via the first switch signal in order to hold the control pressure;

an additional input port configured to receive an additional control pressure provided at an additional brake pressure port being arranged in said control line;

said holding valve being configured to automatically switch into an open position for releasing air from a control port in at least one of an event of a fault in an electronic component and an event of a power failure, wherein air is released from said control port of said main valve assembly for the release of air from said parking brake port independent of said bistable valve;

wherein said holding valve is configured to be held in said holding position for holding the additional control pressure at said control port such that pressure is stored in a portion of said control line connecting a holding valve port of said holding valve to said control port, wherein the pressure stored in said portion of the control line enables the electropneumatic parking brake module to hold a parking brake in a released position;

wherein said additional input port is formed as a first selection valve port of a selection valve unit for receiving the additional control pressure;

said selection valve unit has a check characteristic at said first selection valve port such that said first selection valve port opens in a direction of flow from said additional brake pressure port via a third selection valve port to said control port and closes contrary to the direction of flow; and, wherein said selection valve unit has a bypass line, wherein said bypass line pneumatically connects a second selection valve port and said third selection valve port and has at least one of a throttle and a bypass check valve.

* * * * *